United States Patent [19]

Tohyama et al.

[11] 4,059,553

[45] Nov. 22, 1977

[54] COATING COMPOSITION COMPRISING OXIDES AND/OR HYDROXIDES OF MG++, CA++, CHROMIUM, MANGANESE, AND ZN++ AND QUATERNARY AMMONIUM SILICATES USEFUL FOR BUILDING MATERIALS

[75] Inventors: Masao Tohyama; Minoru Ichigo, both of Nagoya; Takeshi Suzuki, Aichi; Makoto Nakasu, Iwakura; Akinobu Ando, Tajimi; Akitoshi Yoshida, Chiba; Masaharu Kosaka; Norihisa Hayasi, both of Ichikawa; Shigeki Inoue, Funabashi, all of Japan

[73] Assignees: Kikusui Kagaku Kogyo Kabushiki Kaisha; Nissan Kagaku Kogyo Kabushiki Kaisha, both of Tokyo, Japan

[21] Appl. No.: 678,577

[22] Filed: Apr. 20, 1976

[30] Foreign Application Priority Data

Apr. 23, 1975 Japan .................................. 50-49434

[51] Int. Cl.$^2$ ....................... C08K 3/00; C08L 25/14; C04B 13/24; C08F 45/24
[52] U.S. Cl. ............................... 260/29.6 S; 106/105; 106/272; 106/287 S; 260/29.6 M; 260/29.6 PS
[58] Field of Search .................... 260/29.6 PS, 29.6 S, 260/29.6 M; 106/272, 287 S

[56] References Cited

U.S. PATENT DOCUMENTS

| 2,022,547 | 11/1935 | Moore | 106/272 |
|---|---|---|---|
| 2,680,725 | 7/1952 | Battista | 106/287 S |
| 2,905,562 | 9/1959 | Brown | 106/287 S |
| 3,016,358 | 1/1962 | Hustinx | 260/29.6 S |
| 3,130,061 | 4/1964 | McMahon et al. | 106/287 S |
| 3,301,853 | 1/1967 | Weldes | 106/287 S |
| 3,547,669 | 12/1970 | Battista | 106/272 |
| 3,874,887 | 4/1975 | Dalmatoy et al. | 106/287 S |
| 3,895,018 | 7/1975 | Adolf | 260/29.6 S |
| 3,895,956 | 7/1975 | Yoshida et al. | 260/29.6 S |
| 4,002,590 | 1/1977 | Yoshida et al. | 260/29.6 S |

FOREIGN PATENT DOCUMENTS

| 639,949 | 4/1962 | Canada | 106/287 S |
|---|---|---|---|
| 2,458,149 | 12/1974 | Germany | 106/287 S |

*Primary Examiner*—Herbert J. Lilling
*Attorney, Agent, or Firm*—Ladas, Parry, Von Gehr, Goldsmith & Deschamps

[57] ABSTRACT

A coating composition for building materials which comprises 100 parts by weight of a quaternary ammonium silicate having a silica content, calculated as SiO$_2$, of 5 to 70% by weight, 2 to 200 parts by weight of a metal oxide and/or hydroxide capable of converting silica sol to silica gel and water in an amount sufficient to plasticize said composition.

11 Claims, No Drawings

COATING COMPOSITION COMPRISING OXIDES AND/OR HYDROXIDES OF MG++, CA++, CHROMIUM, MANGANESE, AND ZN++ AND QUATERNARY AMMONIUM SILICATES USEFUL FOR BUILDING MATERIALS

BACKGROUND OF THE INVENTION

The present invention relates to a coating composition for protecting and dressing building materials which possesses excellent workability and is capable of producing a hardened, coating film having excellent performance and high utility in protecting and dressing indoor and outdoor walls of buildings.

Coating materials for dressing the indoor and outdoor walls of buildings which have been heretofore used can be classified into organic types and inorganic types according to the type of the binder used therein. The binder used in an organic type coating material generally is an acrylic resin emulsion or a vinyl acetate type resin emulsion. The film resulting from a coating material containing such a synthetic resin binder has low fire resistance and inadequate weather resistance, water resistance, strength, and alkali resistance. Further, it is easily soiled because of its high stickiness. On the other hand, the inorganic type coating material generally contains cement-based binders. Such cement-based binders harden on hydration. Therefore, water must be added and mixed into the coating material immediately before the application thereof. For this reason, the inorganic type coating material gives rise to difficulties in its use and, further, causes effloreescence.

In recent years, a coating material composition containing a binder composed mainly of silica hydrosol (colloidal silica) has been proposed for overcoming the above mentioned difficulties. However, the proposed composition has been found to be still unsatisfactory in film hardness, water resistance and weather resistance.

SUMMARY OF THE INVENTION

It is an object of the present invention to obtain a coating material composition for building materials which possesses excellent workability and is capable of imparting to the resulting coated film excellent water resistance, alkali resistance, and weather resistance, a high hardness, a high initial bonding strength in a wet state, and a high bonding strength after drying.

As a result of our studies to overcome still remaining difficulties accompanying the prior art coating material compositions, we have found that a binder comprising a quaternary ammomium silicate with a metal oxide or hydroxide capable of converting silica sol to silica gel added thereto in a specific ratio exhibits excellent properties as a coating material for building materials. This invention is based on this discovery.

More specifically, the present invention provides a coating material composition for building materials which comprises 100 parts by weight of a quaternary ammonium silicate having a silica content, calculated as $SiO_2$, of 5 to 70 % by weight, 2 to 200 parts by weight of an inorganic alkaline material which is capable of converting silica sol to silica gel and selected from the group consisting of metal oxides, metal hydroxides and mixtures thereof, and water in a quantity sufficient to plasticize said composition.

DETAILED DESCRIPTION OF THE INVENTION

The quaternary ammonium silicate to be used for the present composition is preferably selected from the quaternary ammonium silicates represented by the experimental formula

$$x\,[N^+\,X_1X_2X_3X_4]_2\,O^{2-}\cdot y SiO_2$$

wherein $X_1$, $X_2$, $X_3$ and $X_4$, which may be the same or different, are selected from alkyl groups and hydroxyalkyl groups, each containing from 1 to 20 carbon atoms, and the molar ratio $y/x$ ranges from 3 to 300. In the case where the ratio $y/x$ is lower than 3, the water resistance of the resulting coating film can be inferior due to a high amine content. Where the ratio $y/x$ exceeds 300, the resulting coating film can have an inferior surface hardness and weather resistance as well as a lower water resistance. Thus the range for the ratio $y/x$ is preferably from 3 to 300, particulary from 5 to 100. Examples of the preferable quaternary ammonium silicate are tetramethylammonium silcate, tetraethanolammonium silicate, monomethyltriethanolammonium silicate, dimethyldiethanolammonium silicate, monoethyltripropanolammonium silicate, dimethyldipropanolammonium silicate, and monoethyltripropanolammonium silicate. These quaternary ammonium silicates can be used singly or in mixture.

These quaternary ammonium silicates can be easily prepared, generally, by (a) a method wherein diluted water glass is brought into contact with a hydrogen type cation exchange resin to form an active silica solution, to which is added a quaternary ammonium hydroxide, and the mixture is condensed to a predetermined concentration, or (b) a method wherein a quaternary ammonium hydroxide is reacted with a silica hydrosol. These quaternary ammonium silicates should preferably be dissolved or dispersed in water prior to preparation of the coating composition. When the above mentioned methods are used to prepare the quaternary ammonium silicate, the resulting product is automatically in the form of an aqueous solution or dispersion.

Ordinarily, the quaternary ammonium hydroxide may be prepared by adding an alkylene oxide to ammonia or amines, or by deionizing quaternary ammonium salts with an anion exchange resin. A quaternary ammonium hydroxide containing a residual amount, preferably less than 10%, of tertiary, secondary, or primary amines may be also used. A quaternary ammonium silicate resulting from such a hydroxide may be also used in the present composition.

A quaternary ammonium silicate which is to be used in the present composition should have a silica content, calculated as $SiO_2$, of 5 to 70 % by weight. In the case where a quaternary ammonium silicate having an $SiO_2$ content less than 5 % by weight is used, a hardened coating film possessing sufficient bonding strength and high hardness cannot be obtained. On the other hand, when a quaternary ammonium silicate having an $SiO_2$ content greater than 70 % by weight is used, the resulting hardened film tends to crack in the surface thereof. In order to ensure sufficient protection and dressing of building materials, particularly the quaternary ammonium silicate should preferably have an $SiO_2$ content of 8 to 55 % by weight.

The inorganic alkaline material to be used in combination with the quaternary ammonium silicate can be any of the metal oxides or hydroxides which have been used as a gelling agent for silica sol and include, as preferable examples, the oxides or hydroxides of magnesium, calcium, chromium, manganese and zinc. According to the present invention, these oxides or hydroxides cooperate with the quaternary ammonium silicate to produce a hardening-reaction product which is a forming constituent of a hardening substrate. Such a hardening substrate of the hardening-reaction product possesses sufficient bonding strength and exhibits non-fluidity even in a wet state thereby to prevent "flag" during the application of the present composition. Further, the hardening substrate results in a water-insoluble film having a high bonding strength and hardness after drying.

The metal oxides and hydroxides are ordinarily used in the form of finely divided particles having an average particle size of not greater than 100 $\mu$, preferably up to 60 $\mu$. These oxides and hydroxides may be used singly or in mixtures of the two or more compounds. In particular, magnesia clinker powder resulting from the firing of magnesium oxide, magnesium hydroxide, magnesite or hydromagnesite provides a preferable hardening rate. Therefore, it is particularly suitable. In accordance with the present invention, these oxides or hydroxides should be used in a quantity of 2 to 200 parts by weight, preferably 2 to 100 parts by weight, with respect to 100 parts by weight of the quaternary ammonium silicate. The reasons for this limitation will be described hereinafter.

Coating materials for protecting and dressing the surface of building materials can be classified into those for indoor use and those for outdoor use. An indoor coating material need not withstand severe conditions in view of the circumstances to which it is exposed and its use, whereas on outdor coating material must withstand all severe outdoor conditions such as temperature, humidity, wind, rain and snow, sunlight, and vibration. Further, because these conditions vary greatly and cannot be theorized, an outdoor coating material is required to have good workability under a wide range of practical application conditions. In addition, the performance of the resultant hardened film is remarkably influenced by the degree of workability of the coating material.

In view of these facts, we have made field experiments and found that the addition of the above-mentioned oxide and/or hydroxide to the quaternary ammonium silicate has a very advantageous effect on the workability of the coating material and the physical properties of the resultant film which are affected by the adding quantity of the oxide or hydroxide. More specifically, when the oxide or hydroxide is present in a quantity of less than 2 parts by weight with respect to 100 parts by weight of the quaternary ammonium silicate, the hardened film is poor in water resistance and durability against a freezing and thawing cycle. As a reslt, such a coating material cannot be used in the rainy season and in cold (arctic) regions. On the other hand, in the case where the oxide or hydroxide is added in a quantity of greater than 200 parts by weight, the composition has too short a pot life and the resultant film tends to crack, whereby sufficient protection and dressing of the surface of building materials cannot be achieved. In this manner the addition ratio of the oxide or hydroxide is determined by the performance of the resultant film. Further, since the addition ratio has an effect on the fluidity of the coating composition, in order to form a desired three-dimensional pattern, that is, a lithin-finished surface, on the surface of building materials, a somewhat lower addition ratio should preferably be used, and in order to form a tile-finished surface on the surface of building materials, a somewhat higher addition ratio should preferably be used.

The coating composition of the present invention may optionally contain conventional additives in addition to the quaternary ammonium silicate and metal oxides or hydroxides. The quantity of additive added is one which is conventionally added as required.

A thickening agent is ordinarily used in order to control the fluidity of a composition, and the adding quantity thereof is determined functionally to obtain an adequate fluidity in view of the workability of the resulting composition. Heretofore, cellulose type thickeners have been used for an aqueous material. In contrast, the present invention uses polyacrylic acid salts, ammonia, bentonite, and the like. Sodium and potassium salts of polyacrylic acid are particularly preferred. Since the sodium and potassium salts of polyacrylic acid tend to be non-uniformly dispersed if they are directly added to the composition, it is preferable that they be preliminarily diluted with water, and the resulting aqueous solution or dispersion be added.

If desired, the coating composition of the present invention may contain pigments, aggregates, fillers and water-proofing agents. The pigment includes conventional pigments and extender pigments. Examples of the pigment usable in the present invention are titanium dioxide, iron oxide, chromium oxide, lithopone, zinc sulfide, ultramarine blue, chrome yellow, carbon black, kaolin, mica, red lead, lead dioxide, zinc oxide, zinc chromate, and aluminum oxide. The aggregate or filler includes mountain sand, river sand, sea sand, rocks, minerals, glass, metals, inorganic solid materials and organic solid materials in the form of pulverized masses, coarse particles, powder and finely divided particles.

Examples of these materials are siliceous stone, alumina, calcium carbonate, asbestos, pumice, silica chamotte powder, vermiculite, white marble, plastics powder, wood powder, pearlite, "shirasu-baloon" (porous volcanic sand), and rock wool. The filler or aggregate, when used, is added preferably not exceeding 7000 parts by weight based on 100 parts by weight of the quaternary ammonium silicate.

Examples of the water-proofing agent usable in the present invention are sodium and potassium siliconates and an emulsion of silicone wax or paraffin wax or silicone oil prepared by converting the terminal group of organic polysiloxane to a hydrophilic group. The water-proofing agent, when used, is added preferably not exceeding 1000 parts by weight based on 100 parts by weight of the quaternary ammonium silicate.

The coating composition may be readily prepared by selecting the above listed components according to necessity and adding them together with water in a quantity sufficient to plasticize the composition and mixing the mixture. The quantity of water added is functionally determined from consideration of workability, hang prevention, hardenability, and drying characteristic. Ordinarily, the quantity of water is determined so as to produce a viscosity of 30 to 300000 centipoise of the composition after preparation.

The metal oxide or hydroxide capable of setting the coating composition which is one basic component of the present coating material composition should preferably be added in the final process from the standpoint of good maintenance of workability. The coating composition thus obtained can have a pot life of not shorter than 3 hours. A pot life of not shorter than 3 hours, particularly not shorter than 6 hours, is preferable because of the workability of the composition, and a composition having a pot life of 1 hour or less is poor in workability and fails to give a uniform coating film.

The mixing of the composition may be carried out in a conventional mixer a kneader or the like. Building materials to which the coating material composition can be applied is, for example, concrete, mortar, gypsum boards, gypsum plaster, slate sheets, calcium silicate boards, ALC panels, various metal plates, cloths made of natural or synthetic fibers, and wall papers. The coating composition exhibits excellent protecting and dressing property for indoor and outdoor walls of plates, blocked building materials, buildings and structures made of these materials.

The coating may be carried out by a conventional coating method such as spray coating using various guns, roller coating, and curtain flow coating. Preferably, the coverage is no less than 0.5 kg/m² on a dry basis. It is to be understood that the coating method may be suitably selected in accordance with the fluidity property of the coating composition and the desired film pattern.

Because the coating material composition provides a hardening-reaction product of the quaternary ammonium silicate and the oxides or hydroxides which constitutes a basic component for a hardened film, the resultant film has very high hardness and is not subject to damages such as scratching and scaling, and it is not easily soiled. Further, it possesses excellent water resistance, alkali resistance, weather resistance, chalking resistance amd bonding strength, and, thus, it retains excellent protection and dressing property over a prolonged period of time.

In addition, the present film has excellent water resistance even in a wet state after coating and is not subject to "flagging" even when wet. Furthermore, it withstands a freezing and thawing cycle. For these reasons, the present composition can be used in the rainy season and in cold (arctic) regions. In general, the coating composition of the present invention possesses excellent workability, and the film resulting therefrom retains excellent physical properties even under severe conditions, whereby the present composition is very useful for protecting and dressing building materials.

In order to indicate more fully the nature and utility of this invention, the following specific examples of practice are set forth, it being understood that these examples are presented as illustrative only and that they are not intended to limit the scope of the invention.

EXAMPLE 1 (lithin-finish type wating composition)

a. Preparation of coating composition:

Table 1

| Ingredient | Compositional ratio (weight ratio) | | | |
|---|---|---|---|---|
| | Sample 1 | Sample 2 | Sample 3 | Sample 4 |
| Quaternary ammonium silicate | MMPA*1 100 | DMPA*5 100 | MMTA*6 100 | TEA*7 100 |
| Magnesia clinker | 18 | 19 | 30 | 50 |
| Poly (sodium acrylate) | 1 | 2 | 1 | 2 |
| Acrylic resin emulsion*2 | 5 | 10 | 5 | 10 |
| Filler*3 | 200 | 400 | 200 | 400 |
| Aggregate | Siliceous sand JIS No.3 200 | Siliceous sand JIS No.7 500 | Siliceous sand JIS No.3 200 | Siliceous sand JIS No.7 500 |
| Water proofing agent*4 | 10 | 5 | 10 | 5 |
| Water (total) | 10 | 50 | 10 | 50 |
| Viscosity of coating composition | 4,000c.p. | 13,000c.p | 8,000c.p. | 25,000c.p. |

Note:
*1Monomethyltripropanolammonium silicate having y/x Molar ratio, in the experimental formula x [N$^+$X$_1$X$_2$X$_3$X$_4$]$_2$O$^{2-}$ ySiO$_2$, of 70 (used as a 50% aqueous solution)
*2An aqueous emulsion of a copolymer of styrene and butyl acrylate (solid content of 50%)
*3A mixture of: calcium carbonate, 50% by weight; talc, 25% by weight; clay, 25% by weight
*4An aqueous emulsion of paraffin wax (solid content of 35%)
*5Dimethyldipropanol ammonium silicate (y/x=55, used as a 40% aqueous solution)
*6Monomethyltriethanol ammonium silicate (y/x=30, used as a 50% aqueous solution)
*7Tetraethanol ammonium silicate (y/x=18, used as a 52% aqueous solution)

According to the compositional ratio set forth in Table 1, the ingredients were mixed in a mixing vessel with a high speed mixer accordng to the following procedure to prepare a coating composition. The poly (sodium acrylate) was first dissolved in a portion of the water to be added, and the solution was placed in the mixing vessel. Then, the acrylic resin emulsion and monomethyltripropanolammonium silicate were added in consecutive order into the vessel under agitation, and thereafter, the other ingredients except the magnesia clinker were added thereto. The mixture was stirred to obtain a uniform slurry.

Immediately before coating, the magnesia clinker was added to the slurry with stirring and, finally, the remaining water was added thereto. The resulting mixture was stirred to prepare a lithin-finish type coating composition having a viscosity of about 4000 centipoise.

b. Coating test and film performance test:

The coating composition obtained in (a) was sprayed onto a concrete plate with a coverage of 1.2 kg/m² through a lithin gun having a caliber of 6 to 8 mm under an air pressure of 4 to 5 ,g/cm² to form a lithin surface coating. After drying the coating on the concrete block in air for a week, a uniform film containing no cracks and possessing a high hardness was obtained.

According to the same procedure as described above, the coating composition was sprayed onto a flexible plate measuring 70 cm × 70 cm × 6.3 cm (defined according to JJSA5408) with a coverage of 1.2 kg/m². After drying the coating on the plate in air for a week, the resultant coating film was tested for bonding strength, pencil hardness, water resistance, and alkali resistance. The resultants are shown in Table 2 below. These tests were carried out under the following conditions.

1. Bonding strength of film:

A tensile testing metal fitting was bonded to the lithin surface and back surface of the flexible plate with a two-liquid type epoxy resin adhesive. Tensile force was applied perpendicularly to the coated surface at a loading rate 200 kg/min, by means of a universal tensile tester "tensilon" (manufactured by TOYO SOKUKI Kabushiki Kaisha, Japan) and the strength at which the film separated was measured.

2. Pencil hardness:

The film was successively scratched with pencils of progressively increasing hardness, and the hardness of the pencil preceding a pencil by which the film was scratched for the first time was taken as the pencil hardness of the film.

3. Water resistance:
The plate was immersed in water at a temperature of 20° C for 96 hours. After withdrawing the plate from the water, the state of the film was visually compared with that before the immersion.

4. Alkali resistance:
The plate was immersed in saturated aqueous solution of calcium hydroxide at a temperature of 20° C for 48 hours. After withdrawing the plate from the solution, the surface of the film was visually compared with that before the immersion.

5. Visible crack
The appearance of the surface of the plate was observed visually.

Table 2

| Testing items | Performance of coating film | | | |
|---|---|---|---|---|
| | Example 1 (Sample 1) | Example 2 (Sample 2) | Example 3 (Sample 3) | Example 4 (Sample 4) |
| Bonding Strength (kg/cm$^2$) | 8.0 | 6.0 | 7.5 | 6.5 |
| Pencil hardness | 7H | 5H | 8H | 7H |
| Water resistance | good | good | good | good |
| Alkali resistance | good | good | good | good |
| Visible crack | None | None | None | None |
| Pot Life of Composition* | 12 hrs | 12 hrs | 10 hrs | 8 hrs |

*The time period from the preparation of the composition until the composition substantially hardened.

The resultant film had a high bonding strength and hardness and was excellent in water resistance and alkali resistance.

EXAMPLE 2 (Tile-finish type coating composition)

a. Preparation of coating composition:
Using the same procedure described in Example 1, the ingredients described in Table 1 were formulated into a tile type coating composition (Sample 2) having a viscosity of about 13,000 centipoise.

b. Coating test and film performance test:
The tile type coating composition was sprayed onto a concrete plate with a coverage of 2.5 kg/m$^2$ through a tile gun having a caliber of 6 to 8 mm under an air pressure of 4 to 6 kg/cm$^2$. While the coating film was still wet, water in the form of rain drops was sprinkled onto the film. "Flagging" was not caused. After having been dried, the film had ample hardness and a uniform tile-like surface contaning no cracks. According to the procedure described in item (b) of Example 1, performance tests were conducted with respect to the coating film. The results are shown in Table 2. The resultant film had excellent bonding strength, hardness, water resistance and alkali resistance and, thus, was satisfactory for practical purposes.

EXAMPLE 3

The composition listed in Table 1 under the name of Sample 3 was prepared and tested according to the procedure of Example 1, and the properties also listed in Table 2 were obtained.

EXAMPLE 4

The composition listed in Table 1 under the name of Sample 4 was prepared and tested according to the procedure of Example 2, and the properties also listed in Table 2 were obtained.

In order to fully illustrate the significance of the composition range of the coating material of the present invention, reference examples will be described.

REFERENCE EXAMPLES a. Preparation of coating material composition:
According to the procedure decribed in Example 1, four pairs of coating samples were prepared using the compositional ratios indicated in Table 3, each pair of samples corresponding to Sample 1, 2, 3 or 4 set forth above.

b. Coating test
The lithin-finish type coating compositions (4 samples) and the tile-finish type coating compositions (4 samples) were tested according to the procedures described in Examples 1 and 2, respectively.

Table 3

| Item | Designation | Lithin-finish type coating composition | | Tile-finish type composition | | Lithin type | | Tyle type | |
|---|---|---|---|---|---|---|---|---|---|
| | | Sample 1a | Sample 1b | Sample 2a | Sample 2b | Sample 3a | Sample 3b | Sample 4a | Sample 4b |
| Compositional Ratio | Quaternary ammonium silicate | MMPA 100 | MMPA 100 | DMPA 100 | DMPA 100 | MMTA 100 | MMTA 100 | TEA 100 | TEA 100 |
| | Magnesia clinker | 1 | 120 | 1 | 200 | 1 | 220 | 1 | 220 |
| | Poly (sodium acrylate | 1 | 1 | 2 | 2 | 1 | 1 | 2 | 2 |
| | Acrylic resin emulsion | 5 | 5 | 10 | 10 | 5 | 5 | 10 | 10 |
| | Filler | 200 | 200 | 400 | 400 | 200 | 200 | 400 | 400 |
| | Aggregate | Siliceous sand JIS No.3 200 | Siliceous sand JIS No. 3 200 | Siliceous sand JIS No.7 500 | Siliceous sand JIS No.7 500 | Siliceous sand JIS No.3 200 | Siliceous sand JIS No.3 200 | Siliceous sand JIS No.7 500 | Siliceous sand JIS No.7 500 |
| | Water proofing agent | 10 | 10 | 10 | 10 | 10 | 10 | 10 | 10 |
| | Water (total) | 10 | 10 | 50 | 50 | 10 | 10 | 50 | 50 |
| Properties of coating film | Bonding strength kg/cm | 8.5 | 5.0 | 6.5 | 8.0 | 8.0 | 6.0 | 7.0 | 6.5 |
| | Pencil hardness | 7H | 2H | 5H | H | H | 7H | HB | 3H |
| | Water resistance | bad | good | bad | good | bad | good | bad | good |
| | Alkali resistance | good | good | good | good | good | good | good | good |
| | Visible crack | a few | none | a few | a few | a few | many | a few | many |
| | Pot life of | | | | | | | | |

Table 3-continued

| Item | Designation | Lithin-finish type coating composition | | Tile-finish type composition | | Lithin type | | Tyle type | |
|---|---|---|---|---|---|---|---|---|---|
| | | Sample 1a | Sample 1b | Sample 2a | Sample 2b | Sample 3a | Sample 3b | Sample 4a | Sample 4b |
| Composition | 16 hrs. | about 6 hrs | 16 hrs. | about 3 hrs | 16 hrs | 1 hr | 16 hrs | 1 hr | |

It is apparent from Table 3 that when the composition of the coating material is outside the compositional range of the present invention, the properties of the resulting film are substantially inferior. Further, in the case where the metal oxide or hydroxide (herein, magnesia clinker) is used in large quantities, the time during which the coating composition can be worked is very short (too short a pot life), so that application in the field at a construction site is almost impossible. Moreover, too little addition of the metal oxide or hydroxide is liable to generate cracks due to predominant contraction of the binder component and poor utilization of the expansion of the metal oxide at the time of the hydration thereof, while too much addition of the metal oxide is liable to generate cracks due to contraction of the hydrated metaloxide under drying.

We claim:

1. A coating composition for building materials which comprises 100 parts by weight of a quaternary ammonium silicate having a silica content, calculated as $SiO_2$, of 5 to 70% by weight; 2 to 200 parts by weight of a metal compound selected from the group consisting of oxides and hydroxides of magnesium, calcium, chromium, manganese and zinc and mixtures thereof; and water in a quantity sufficient to plasticize said composition.

2. The composition according to claim 1 wherein said metal compound is magnesia clinker powder prepared by firing a member selected from the group consisting of magnesium oxide, magnesium hydroxide and hydromagnesite.

3. The composition according to claim 1 wherein said metal compound is in the form of powder having an average particle size of 1 to 100 microns.

4. The composition according to clam 1 wherein said quaternary ammonium silicate is selected from the compounds represented by the experimental formula

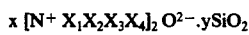

$x\ [N^+ X_1X_2X_3X_4]_2\ O^{2-} \cdot ySiO_2$ wherein $X_1$, $X_2$, $X_3$ and $X_4$ are respectively selected from the group consisting of alkyl groups and hydroxyalkyl groups, each containing from 1 to 20 carbon atoms, and the molar ratio y/x ranges from 3 to 300.

5. The composition according to claim 4 wherein said quaternary ammonium silicate is selected from the group consisting of tetramethylammonium silicate, tetraethanolammonium silicate, monomethyltriethanol ammonium silicate, dimethyldiethanolammonium silicate, monomethyltripropanolammonium silicate, monoethyltriethanolammonium silicate, dimethyldiethanolammonium silicate, monoethyltripropanolammonium slicate, and mixtures thereof.

6. The composition according to claim 1 further comprising at least one additive selected from the group consisting of thickening agents, pigments, aggregates, fillers and water proofing agents.

7. The composition according to claim 1 further comprising a thickening agent selected from the group consiting of salts of polyacrylic acid, ammonia and bentonite.

8. The composition according to claim 1 further comprising a filler in the form of coarse or fine particles selected from the group consisting of siliceous stone, alumina, calcium carbonate, asbestos, pumice, silica, chamotte powder, wood powder, pearlite, porous volcanic sand and rock wool.

9. The composition according to claim 1 further comprising a water-proofing agent selected from the group consisting of sodium siliconate, potassium siliconate, and emulsions of silicone wax, paraffin wax and silicone oil of modified organic polysiloxane prepared by converting the terminal group of the polysiloxane to a hydrophilic group.

10. The composition according to claim 1 wherein said water is used in a quantity sufficient to provide a viscosity of 30 to 300,000 centipoise.

11. The composition according to claim 1 prepared by adding said inorganic alkaline material at the final stage of the preparation of said composition.

* * * * *